United States Patent
Legrand et al.

(10) Patent No.: US 8,757,553 B2
(45) Date of Patent: Jun. 24, 2014

(54) ACTIVE TIE-ROD SYSTEM FOR HOLDING AND SMOOTHLY RELEASING SPACE APPENDAGES

(75) Inventors: Silvain Legrand, Nice (FR); Yannick Baudasse, Grasse (FR)

(73) Assignee: Thales, Neuilly-sur-Seine (FR)

( * ) Notice: Subject to any disclaimer, the term of this patent is extended or adjusted under 35 U.S.C. 154(b) by 550 days.

(21) Appl. No.: 12/912,515

(22) Filed: Oct. 26, 2010

(65) Prior Publication Data
US 2011/0108670 A1    May 12, 2011

(30) Foreign Application Priority Data
Nov. 10, 2009    (FR) ...................................... 09 05401

(51) Int. Cl.
*B64G 1/00*    (2006.01)
(52) U.S. Cl.
USPC ....................................................... 244/159.5
(58) Field of Classification Search
USPC .......... 244/159.5, 172.6, 172.7, 172.9, 173.3, 244/131
See application file for complete search history.

(56) References Cited

U.S. PATENT DOCUMENTS

| | | | | | |
|---|---|---|---|---|---|
| 4,641,798 | A | * | 2/1987 | De Haan et al. | 244/172.9 |
| 5,060,888 | A | * | 10/1991 | Vezain et al. | 244/173.3 |
| 5,829,253 | A | * | 11/1998 | Long et al. | 60/528 |
| 6,175,989 | B1 | * | 1/2001 | Carpenter et al. | 16/225 |
| 6,299,105 | B1 | * | 10/2001 | Gilmore | 244/172.6 |
| 6,661,331 | B2 | * | 12/2003 | Valembois et al. | 337/401 |
| 7,222,822 | B2 | * | 5/2007 | Roth et al. | 244/172.7 |
| 7,410,129 | B2 | * | 8/2008 | Legrand et al. | 244/159.5 |
| 7,422,403 | B1 | * | 9/2008 | Johnson et al. | 411/82.5 |

FOREIGN PATENT DOCUMENTS

| | | |
|---|---|---|
| EP | 0 402 263 A1 | 12/1990 |
| FR | 2 857 936 A1 | 1/2005 |
| JP | 10-310100 A | 11/1998 |

* cited by examiner

*Primary Examiner* — Valentina Xavier
(74) *Attorney, Agent, or Firm* — Baker & Hostetler LLP (57) ABSTRACT

The present invention consists of an active tie-rod device making it possible to hold and smoothly release space appendages. The active tie-rod device includes a fixed base, an active tie-rod screwed into the said fixed base, a retractable release mechanism for the active tie-rod making it possible, in the stowed position, to hold the said active tie-rod in place, and a nut for tensioning the assembly. The active tie-rod includes an internal heater, and consisting at least partially of a material with a high coefficient of thermal expansion, so that, under the action of the internal heater, the active tie-rod can expand, retracting the retractable release mechanism for the active tie-rod, and consequently allowing the smooth release of the said space appendages.

14 Claims, 8 Drawing Sheets

ACTIVE TIE-ROD SYSTEM FOR HOLDING AND SMOOTHLY RELEASING SPACE APPENDAGES

CROSS-REFERENCE TO RELATED APPLICATION

This application claims priority to foreign French patent application No. FR 0905401, filed on Nov. 10, 2009, the disclosure of which is incorporated by reference in its entirety.

FIELD OF THE INVENTION

The present invention relates to the space field and, more precisely, consists of an active tie-rod system making it possible to hold and smoothly release space appendages.

BACKGROUND OF THE INVENTION

"Space appendages" means space equipment designed to be deployed in space, such as solar generators or antennas for example. The invention consists of a simple and robust solution allowing the smooth release of such space appendages.

The function of this type of system is initially to hold in a stowed position one or more space appendages, that is to say in general movable elements that can be deployed on either side of the body of the satellite and, secondly, to release the said appendages smoothly. The invention relates mainly, but not exclusively, to the situation in which the space appendages are solar generators. The system for holding in the stowed position and for releasing the appendages conventionally mainly consists of a separation nut and a tie-rod placed in tension. In practice, in the known systems, the tie-rod participates, with the nut, in tensioning a series of stacked elements, such as solar generators folded one on top of the other for the purpose of minimizing the volume of the satellite for the purpose of the launch, and allowing the launch loads to pass by friction.

Figure 2:
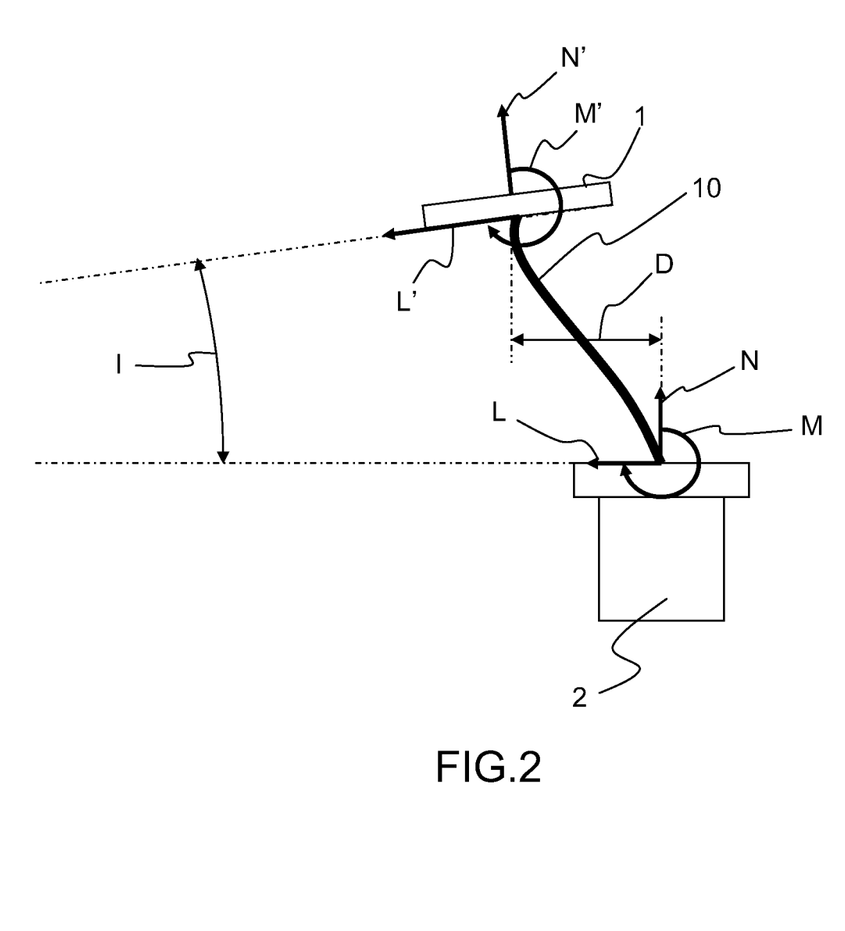
FIG. 2: the simplified representation of the type of geometric and dynamic defects that a tie-rod may have.

However, it is known that, in this type of device, the tie-rod has geometric defects which can be considerable, in particular if the number of stacked elements is high. As shown in FIG. 2, the said geometric defects may be defects of inclination or of displacement for example. These geometric defects may cause dynamic defects resulting in radial forces or clamping moments being exerted at the ends of the tie-rod.

Failure to take account of these defects may cause serious malfunctions which may go as far as the failure of the space appendages to deploy and therefore possibly involving loss of the mission.

Another known problem lies in the impact that can occur when the tie-rod is released. The nut device mentioned above is responsible for releasing the tie-rod. The said tie-rod is, at the moment of its release, in a stressed state and its sudden release can cause impacts that can damage the space appendages or the satellite itself. In the context of certain current devices, the problem doubles. Specifically, initially the tie-rod is released by a pyrotechnic lock the explosion of which causes a first impact. Then, with the tie-rod being under tension before being released, its sudden release, already mentioned, can cause damage to the space appendages or to the carrying structure. For the purpose of minimizing this problem, "low shock" nuts have been developed. This type of complex nut is usually a one-shot nut and can be reconditioned. However, the "low shock" ability of these nuts applies only to triggering the release of the tie-rod and not to the release of the appendages as such. Specifically, the geometric defects of the tie-rod are not really compensated for and, particularly if the tie-rod has large dimensions, there is still a sudden expansion of the tie-rod that can cause an impact that is sometimes considerable, the tie-rod hitting the space appendages. This is explained notably by the fact that the release of the stressed tie-rod remains sensitive to the angular deviations of the said tie-rod.

In summary, there is no satisfactory solution in the prior art for overcoming the geometric defects of the tie-rod and for allowing its smooth release. The invention proposes a simple and robust solution to solve this dual problem. It lies essentially in the use of an active tie-rod device controlled by means of a heater inside or outside the said tie-rod.

SUMMARY OF THE INVENTION

Accordingly, the subject of the invention is an active tie-rod device making it possible to hold and smoothly release space appendages, the said active tie-rod device including:
   a fixed base,
   an active tie-rod screwed into the said fixed base,
   a retractable release mechanism for the active tie-rod making it possible, in the stowed position, to hold the said active tie-rod in place,
   a nut for tensioning the assembly,
wherein said active tie-rod comprises an internal or external heater, and in that the said active tie-rod consists at least partially of a material with a high coefficient of thermal expansion, greater than or equal to approximately $20 \times 10^{-6}$, for example aluminium or shape-memory alloys, so that, under the action of the internal or external heater, the active tie-rod can expand, retracting the retractable release mechanism for the active tie-rod, and consequently allowing the smooth release of the said space appendages.

In one embodiment of the invention, the active tie-rod consists of several layers of materials alternating between layers of materials with a low coefficient of thermal expansion, less than or equal to $1.5 \times 10^{-6}$, such as Invar™, and layers of materials with a high coefficient of thermal expansion, greater than or equal to approximately $20 \times 10^{-6}$, for example aluminium or shape-memory alloys.

The material with a low coefficient of thermal expansion may be Invar™.

The material with a high coefficient of thermal expansion may be aluminium or any shape-memory material.

The space appendages are, for example, solar generators or antennas.

Advantageously, the retractable release mechanism for the active tie-rod consists of a set of retractable claws held in position by means of springs.

Advantageously, the fixed base may comprise a swivel joint into which the active tie-rod is screwed, in order to make it easier to release the said active tie-rod smoothly.

The invention also includes a smooth release method for space appendages, wherein it includes the use of an active tie-rod device as described above, and using the following steps:
   a release step during which the internal or external heater of the active tie-rod is activated and causes the said active tie-rod to lengthen and, under the effect notably of the lengthening of the active tie-rod, the retractable release mechanism for the active tie-rod retracts and allows free passage to the active tie-rod,
   a deployment step during which the space appendages are fully opened.

Advantageously, the method according to the invention may also comprise a step of repackaging the said active tie-rod device.

Advantageously, since the active tie-rod consists of a shape-memory material, the repackaging step results in:
- the heating of the tie-rod by the action of the internal or external heater,
- the placing in compression of the tie-rod by means of a press,
- the cooling of the active tie-rod, which resumes its initial shape,
- the repositioning of the space appendages and the returning to its place of the retractable release mechanism for the active tie-rod.

BRIEF DESCRIPTION OF THE DRAWINGS

Other features and advantages of the invention will appear with the aid of the following description made with reference to the appended drawings which represent.

DETAILED DESCRIPTION

Figure 1A:
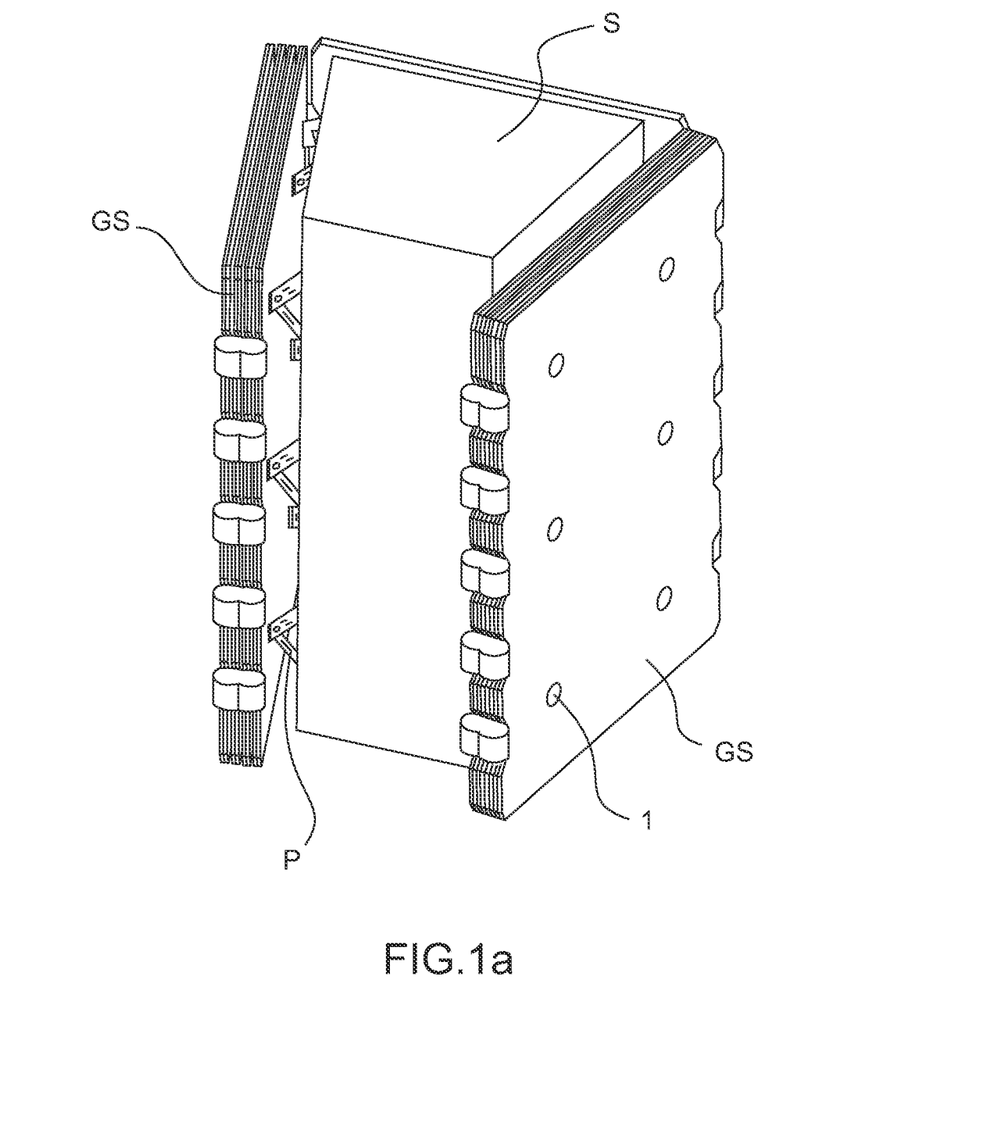
FIG. 1a: the schematic view of a satellite comprising space appendages in the stowed position.
Figure 1B:
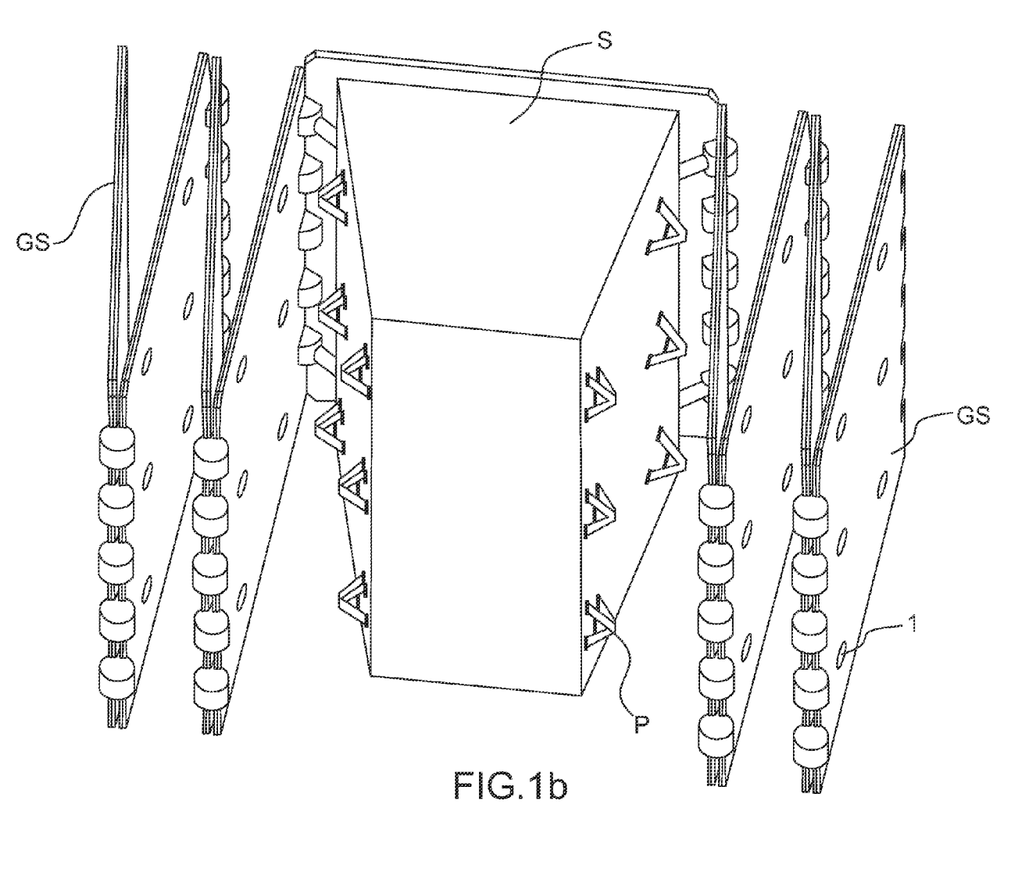
FIG. 1b: the schematic view of a satellite comprising space appendages being deployed.
Figure 1C:
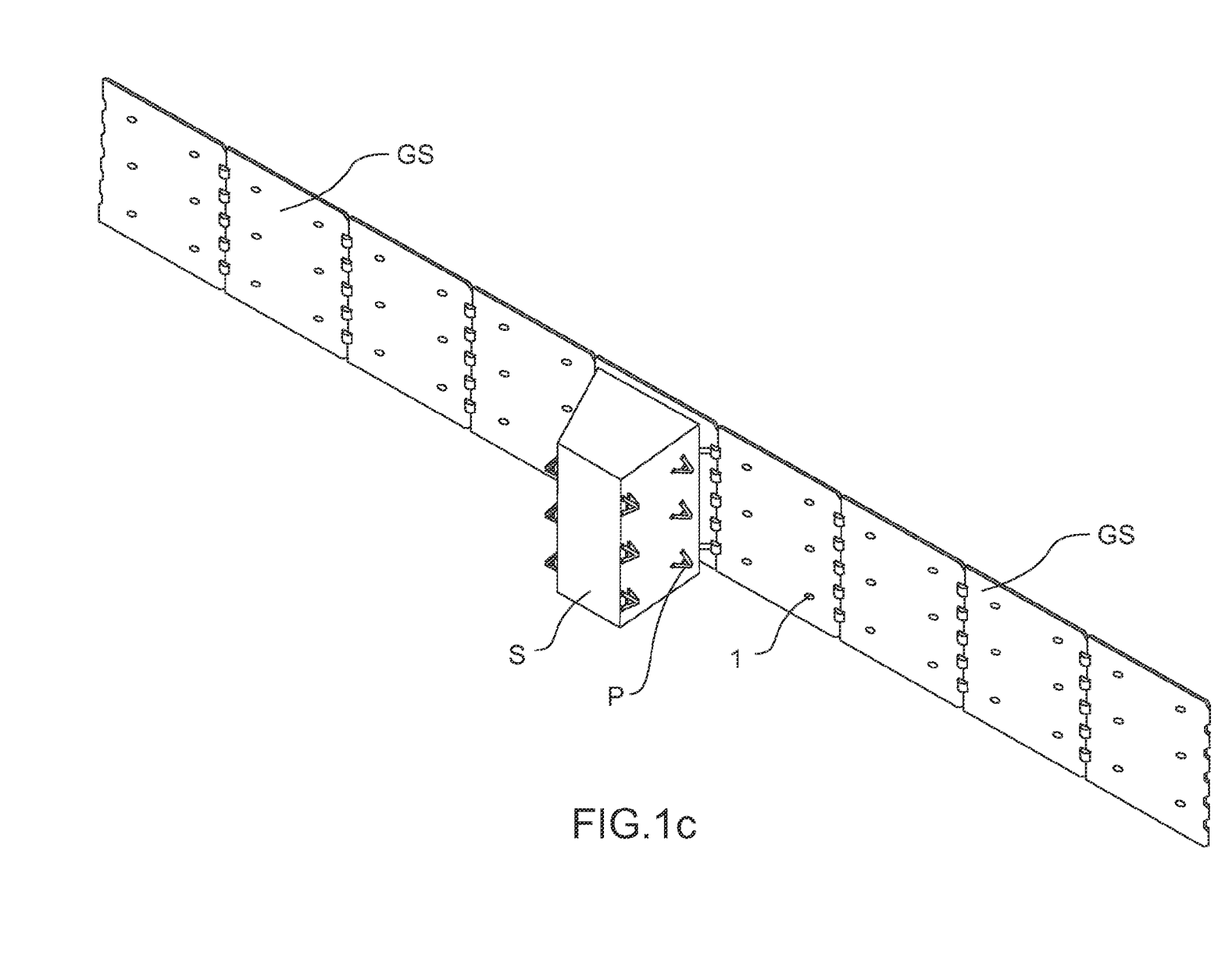
FIG. 1c: the schematic view of a satellite comprising space appendages in the deployed position.

The object of FIGS. 1a, 1b, 1c is to show very simply an example of a satellite having deployable space appendages. In these three figures, a satellite formed of a body S, with, on either side of the said body S, space appendages AP such as solar generators, is shown. In FIG. 1a, the space appendages AP are in the stowed position. The space appendages AP each consist in this instance of four panels folded onto one another and held in place by an appropriate device. This appropriate device comprises in this instance tripods P on which the folded space appendages AP rest, each tripod P interacting with a device, not shown, consisting for example of a separation nut associated with a tie-rod, each tie-rod passing through each panel at a bush 1 arranged and incorporated in the said panel. As can be seen in FIGS. 1a, 1b, 1c, there are, in this context, for each of the two space appendages AP, six tripods P, associated with six nuts and six tie-rods, and six bushes per panel.

Clearly, it is in this stowed position that the satellite must be incorporated into the nose cone of the space launcher responsible for dispatching it.

FIG. 1b shows the same satellite as FIG. 1a, but its space appendages AP are being deployed. Specifically, the appropriate means for holding the space appendages AP in place allows the said space appendages AP to be released at the right moment, and the solar panels are unfolded. The deployment can be controlled by an electric motor not shown.

In FIG. 1c, the space appendages AP are deployed, allowing the satellite to complete its mission.

FIG. 2 illustrates the type of geometric defects, already mentioned above, that a tie-rod may have in a device for holding in position and releasing space appendages of the prior art. As shown in FIG. 2, problems of inclination I may arise because it is impossible to obtain perfect parallelism between the bushes 1 of the space appendages and the separation nuts 2. In the same way, a misalignment between a bush 1 and a nut 2 causes a geometric defect of displacement D. These problems of inclination I and displacement D cause dynamic defects, stresses being applied to the tie-rod 10. For example, the said tie-rod 10 may sustain radial forces L,N,L', N' that are applied to its ends. Moreover, clamping moments M,M' due to the twisting of the tie-rod 10 can be applied to the nut 2 and to the bush 1. Because of these geometric defects, it may be difficult to obtain the release of the space appendages, which may have serious consequences for the course of the mission. Specifically, if this type of geometric defect were to make it impossible to deploy, for example, the solar generators, the mission would be lost.

Figure 3:
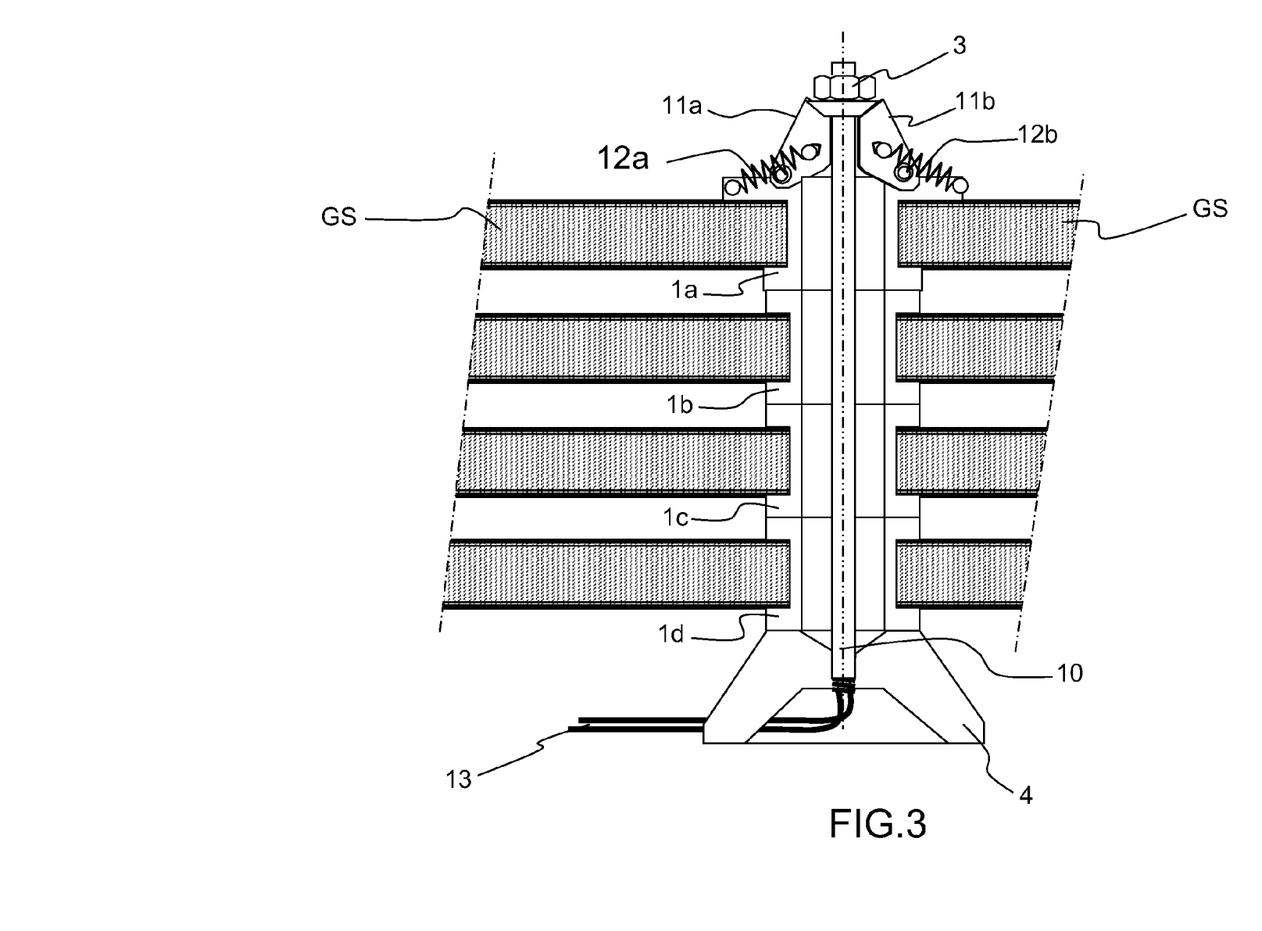
FIG. 3: the diagram of an example of an active tie-rod system according to the invention, in the stowed position.
Figure 4:
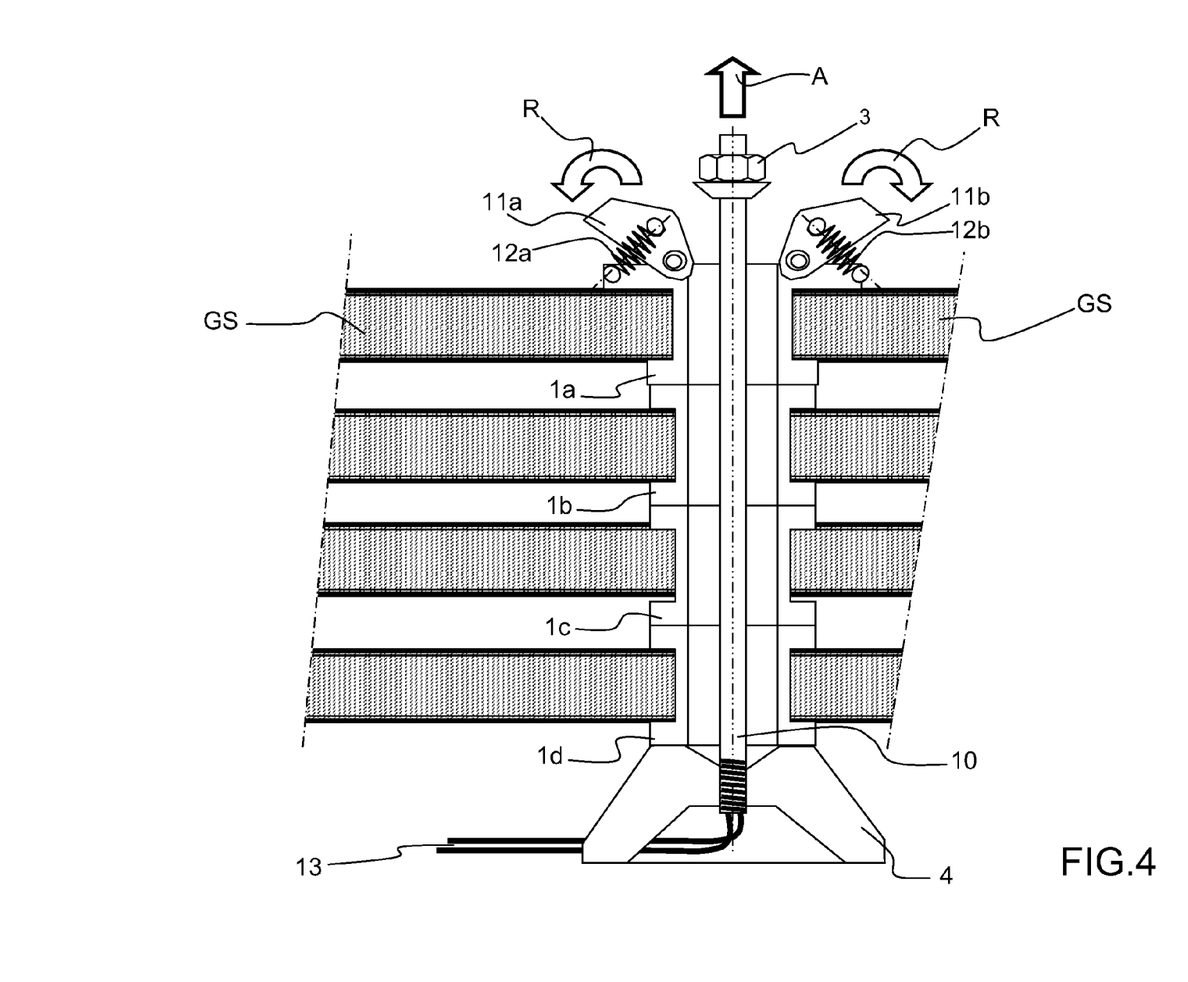
FIG. 4: the diagram of an example of an active tie-rod system according to the invention on triggering the release of the tie-rod.
Figure 5:
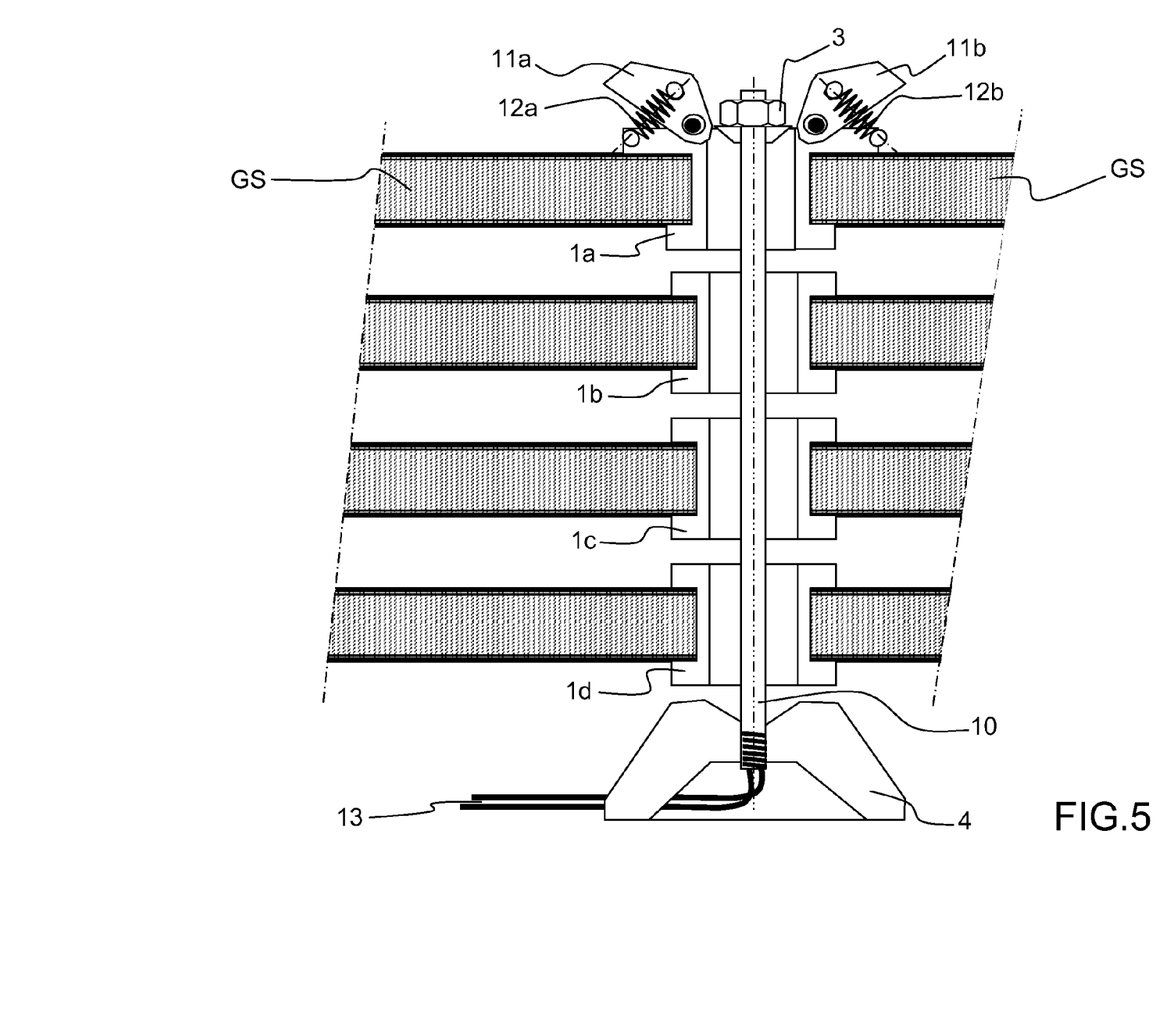
FIG. 5: the diagram of an example of an active tie-rod system according to the invention, at the beginning of the phase of deployment of the space appendages.

FIGS. 3, 4, 5 represent the device according to the invention in an exemplary embodiment during three phases of use.

FIG. 3 represents the device according to the invention in the stowed position. The deployable space appendages AP held in place by the device according to the invention may for example be solar generators. In the example of FIGS. 3, 4, 5, they consist of four panels folded onto one another. They may be any other type of deployable space appendages. The space appendages AP are not shown in their entirety, since attention is drawn to the device according to the invention. This device comprises a fixed base 4 into which an active tie-rod 10 is screwed incorporating an internal heater 13; the said device also comprises a tensioning screw 3 and a retractable mechanism 11a, 11b, 12a, 12b for releasing the tie-rod.

It should be noted that instead of or in addition to the internal heater 13, the device according to the invention may comprise an external heater, not shown.

Within each panel, at least one aperture is arranged into which a bush 1a, 1b, 1c, 1d is incorporated. These bushes 1a to 1d allow the active tie-rod 10 to pass through. Depending on the size of the space appendages, there may be several apertures and as many bushes per element. For example, as shown in FIGS. 1a to 1c, each panel of a space appendage AP may comprise six bushes.

In the stowed position, the internal heater 13 is inactive. The panels are stacked on one another and the active tie-rod 10 passes through them. At the end opposite to the fixed base 4, the retractable release mechanism for the tie-rod 11a, 11b, 12a, 12b makes it possible to hold the stack of panels in place. This retractable release mechanism for the tie-rod 11a, 11b, 12a, 12b consists, for example, of a set of retractable claws 11a and 11b, respectively held in position by springs 12a and 12b. An example of the retractable release mechanism for the tie-rod suitable for the function of holding in place and of releasing that is necessary to the application of the invention is notably described in French patent No. 2857936. The function of this retractable release mechanism for the tie-rod 11a, 11b, 12a, 12b consists on the one hand in interacting with the active tie-rod 10 in order to hold the space appendages in the folded position, which will make it possible to absorb the loads due to the launch, and, on the other hand, in retracting in the absence of stress in order to allow the active tie-rod 10 to pass.

Finally, the device comprises a nut 3 for tensioning the assembly. This tensioning notably allows the launch loads to pass by friction between the various elements.

The diagram of FIG. 4 shows the release phase of the active tie-rod 10. At the appropriate moment, that is to say for the purpose of the deployment of the space appendages AP, the internal heater 13 is activated. The said internal heater 13 makes it possible to increase the temperature of the active tie-rod 10 which, being made of an appropriate material, expands under the effect of the heat. The material forming the active tie-rod 10 can be a material with a high coefficient of thermal expansion, greater than or equal to $20 \times 10^{-6}$, such as, for example, aluminium. It may also be a shape-memory alloy. The tie-rod may also have a more complex structure such as that described in FIG. 6. Under the effect of the expansion A of the active tie-rod 10, the retractable release mechanism for the tie-rod 11a, 11b, 12a, 12b folds back R onto the springs 12a, 12b in order to allow the active tie-rod 10 to pass. The deployment of the space appendages can therefore begin. It will be noted that, even though it is not shown in the figures, the fixed base 4 may comprise a swivel joint into which the active tie-rod 10 is fixed, the presence of this swivel joint making it easier to release the said active tie-rod 10.

FIG. 5 represents simply the beginning of deployment of the space appendages AP. Because of the elongation of the active tie-rod 10, since the said active tie-rod passes through the bushes 1a to 1d of the panels without contact, the panels can unfold. When the elongation of the active tie-rod is sufficient, the internal heater 13 can be deactivated.

It will be noted that, during a test phase on the ground, this type of device can, after deployment of the appendages, be repackaged, when the active tie-rod 10 consists of a shape-memory alloy. In this case, it is sufficient to fold up the panels in the stowed position and, after the repackaging of the active tie-rod 10, to replace the retractable release mechanism for the tie-rod 11a, 11b, 12a, 12b and, if necessary, to retighten the nut 3.

Figure 6:
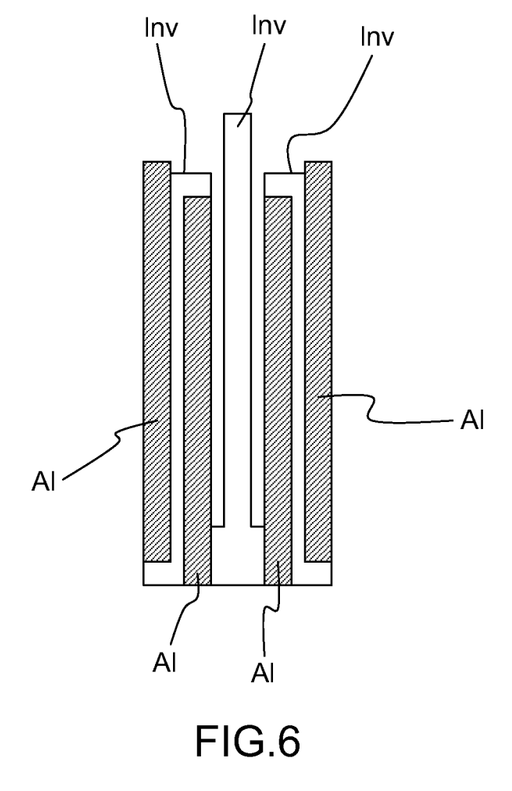
FIG. 6: an example of a multi-layer tie-rod according to one embodiment of the invention.

FIG. 6 represents an alternative solution to that shown in FIGS. 3 to 5 concerning the structure of the active tie-rod 10. Specifically, arrangement requirements may impose an active tie-rod 10 of reduced length. In this case, it will be possible to use a tie-rod like that of FIG. 6, consisting of several stages alternating stages of material, marked Al in the figure, with a high coefficient of thermal expansion, greater than or equal to $20 \times 10^{-6}$, for example aluminium or shape-memory alloys, and stages of material, marked Inv in the figure, with a very low coefficient of thermal expansion, less than or equal to $1.5 \times 10^{-6}$, such as Invar™.

In summary, the invention has the advantage of forming a simple and robust solution to the technical problems listed above relating to the smooth release of space appendages and to the absorption of the geometric defects of the tie-rods used in the devices making it possible to hold and release the said space appendages. The solution proposed by the present invention consists mainly in using an active tie-rod device comprising an internal heater.

It should be noted that the present invention can be used in many cases where the deployment of space appendages is necessary, whether they be solar generators, antennas or else heat-protection panels for example.

The invention claimed is:

1. An active tie-rod device for holding and smoothly releasing space appendages, the active tie-rod device comprising:
    a fixed base;
    an active tie-rod screwed into the fixed base;
    a retractable release mechanism that holds the active tie-rod in place when the active tie-rod device is in a stowed position; and
    a nut for tensioning the active tie-rod against the retractable release mechanism,
    wherein said active tie-rod includes a heater having a structure disposed on an internal or external surface of the active tie-rod, and
    wherein said active tie-rod includes a material having a high coefficient of thermal expansion, the high coefficient of thermal expansion being greater than or equal to approximately $20 \times 10^6$, so that heating the active tie-rod by the heater urges a first end of the active tie-rod away from a second end of the active tie-rod, thereby retracting the retractable release mechanism for the active tie-rod, and consequently effecting a smooth release of the space appendages, the first end of the active tie-rod being opposite the second end of the active tie-rod.

2. The device according to claim 1, wherein the active tie-rod comprises a plurality of material layers including a first layer and a second layer, the first layer having a first material with a coefficient of thermal expansion less than or equal to $1.5 \times 10^{-6}$, the second layer having a second material with a coefficient of thermal expansion greater than or equal to approximately $20 \times 10^{-6}$.

3. The device according to claim 1, wherein said second material is aluminum or a shape-memory material.

4. The device according to claim 1, wherein said space appendages are solar generators, antennas, or heat-protection panels.

5. The device according to claim 1, wherein said retractable release mechanism for the active tie-rod consists of a set of retractable claws held in position by means of springs.

6. The device according to claim 1, wherein said fixed base comprises a swivel joint into which the active tie-rod is screwed, in order to make it easier to release the active tie-rod smoothly.

7. A smooth release method for space appendages, comprising the use of an active tie-rod device according to claim 1, the method comprising the following steps:
    a release step during which the heater of the active tie-rod is activated and causes the active tie-rod to lengthen and, under the effect notably of the lengthening of the active tie-rod, the retractable release mechanism for the active tie-rod retracts and allows free passage to the active tie-rod; and
    a deployment step during which the space appendages are fully opened.

8. The method according to claim 7, further comprising a step of repackaging the active tie-rod device.

9. The method according to claim 8, wherein said active tie-rod comprises a shape-memory material, and the repackaging step results in:
    the heating of the tie-rod by the action of the heater,
    the placing in compression of the active tie-rod by means of a press,
    the cooling of the active tie-rod, which resumes its initial shape, and
    the repositioning of the space appendages and the returning to its place of the retractable release mechanism for the active tie-rod.

10. The device according to claim 2, wherein the second layer is disposed outside the first layer in a radial direction of the active tie-rod.

11. The device according to claim 2, wherein the second material is aluminum.

12. The device according to claim 2, wherein the second material is a shape memory material.

13. The device according to claim 1, wherein the structure of the heater is disposed on an internal surface of the active tie-rod.

14. The device according to claim 1, wherein heating the active tie-rod by the heater urges the first end of the active tie-rod away from the second end of the active tie-rod along a longitudinal axis of the active tie-rod.

* * * * *